United States Patent [19]

Imhof et al.

[11] Patent Number: 5,094,774
[45] Date of Patent: Mar. 10, 1992

[54] HIGH-FLOWABILITY AQUEOUS NICKEL HYDROXIDE OR HYDRATED NICKEL OXIDE PASTE FOR VIBRATION FILLING ELECTRODE FRAMEWORKS

[75] Inventors: Otwin Imhof, Nürtingen; Holger Kistrup, Esslingen; Claus Schneider, Fellbach, all of Fed. Rep. of Germany

[73] Assignee: Duetsche Automobilgesellschaft mbH, Fed. Rep. of Germany

[21] Appl. No.: 680,572

[22] Filed: Apr. 4, 1991

[30] Foreign Application Priority Data

Apr. 4, 1990 [DE] Fed. Rep. of Germany ....... 4010811

[51] Int. Cl.$^5$ .................................. H01M 4/88
[52] U.S. Cl. ..................... 252/182.1; 252/313.1; 429/223
[58] Field of Search ............ 252/182.1, 313.1; 429/223

[56] References Cited

U.S. PATENT DOCUMENTS 4,064,332 12/1977 Elfwing et al. ................ 429/223
4,481,128 11/1984 Jackovitz et al. ............. 252/182.1
4,940,553 7/1990 von Benda et al. ............ 252/182.1

FOREIGN PATENT DOCUMENTS 1496352 2/1971 Fed. Rep. of Germany .
3817826 11/1989 Fed. Rep. of Germany .
3913061 11/1989 Fed. Rep. of Germany .

OTHER PUBLICATIONS

Sonderdruck aus der Zeitschrift, Chemie-Ingenieur-Technik.
Grundlagen von Elektrodenreaktionen—Oct. 1983.
Entwicklungsarbeiten an Nickel/Wasserstoff-Zeller für die Elektrotraktion.
Alkalische Batterien für Elektrostrassenfahrzeuge—technische und wirtschafthche Aspekte.
Für die Berufspraks—35.folge—Chemie Ingenieur Technik.

Primary Examiner—Peter A. Nelson
Attorney, Agent, or Firm—Evenson, Wands, Edwards, Lenahan & McKeown

[57] ABSTRACT

An aqueous nickel hydroxide paste for the mechanical impregnation of fibrous-structure electrode frameworks. The polydisperse solid total system of solid particles in the nickel hydroxide or hydrated nickel oxide paste has a particular particle-size distribution (distribution ogive) which may vary within narrow limits and is preferably evaluated in a RRSB particle-size grid according to P. Rosin, E. Rammler, K. Sperling and I. G. Bennett. The resulting paste can be filled into differing frameworks in one operation, as a moist active mass (paste), to a degree of filling of 94% to 100%, without constituents of the paste (particularly at the lower edge during handling in the vertical position) draining off or escaping again. Preferably, the choice of the particle-size distribution of the nickel hydroxide powder used is so fine that the technical comminution work in the production of the paste is very small and that the production times for the paste can consequently be substantially reduced.

4 Claims, 1 Drawing Sheet

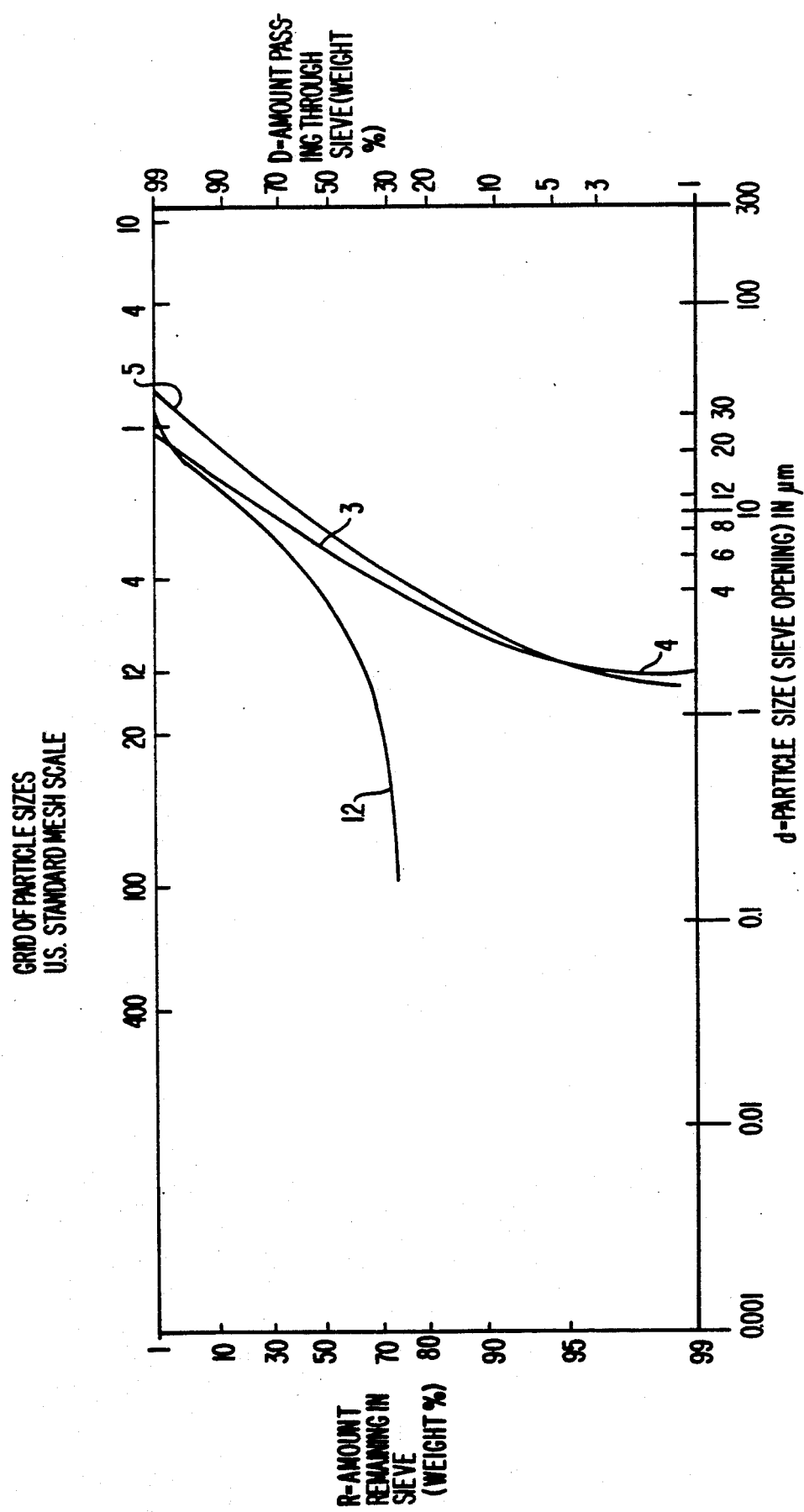

HIGH-FLOWABILITY AQUEOUS NICKEL HYDROXIDE OR HYDRATED NICKEL OXIDE PASTE FOR VIBRATION FILLING ELECTRODE FRAMEWORKS

BACKGROUND AND SUMMARY OF THE INVENTION

The present invention relates to an aqueous nickel hydroxide or hydrated nickel oxide paste of the generic type disclosed by German Patent Specification 3,817,826.

For several years, not only secondary batteries but also previously tried and tested alkaline storage batteries have undergone further development for use in electric traction (research and development of 000 systems). "Alkaline batteries for electric road vehicles—technical and economic aspects" (Chem.-Ing.-Tech. 51 (1979), No. 6, pages 583 ff.) describes the requirements imposed on a traction battery, the state of development and technical problems in the case of batteries containing an alkaline electrolyte, as well as the economic aspects. A more recent work by G. Benczur, G. Berger and Haschka entitled "Electrodes with fibrous structure" (Eleckrotechnische Zeitschrift etz, vol. 104 (1983), No. 21, page 1098 ff.) deals, inter alia, with the wide variety of electrode designs such as pocket-type plates, tube-type electrodes, sintered electrodes and fibrous-structure electrodes. The optimum structure and the velocity-determining parameters of transport processes in frequently porous electrodes at high current density are reported on for electrochemical cells designed for energy conversion and storage by, for example, K. Mund ("Investigation of porous electrode structures by means of impedance measurements", Dechema monographs, volume 102, VCH Verlagsgessellschaft, 1986, pages 83 ff.). Furthermore, German Auslegeschrift 1,496,352 discloses storage battery electrodes composed of a structure of metallic fibers arranged in parallel. Chem.-Ing.-Tech. 53 (1981), No. 2, pages 109 ff. discloses the further development of a plastic composite electrode for lead storage batteries. Chem.-Ing.-Tech. 51 (1979), No. 6, pages 654 ff. deals with the development of NiOOH electrodes having good load-carrying capacity, high unit-area capacity and metallic fibrous structures. Finally, German Patent Specification 3,817,826 claims a high-flowability aqueous nickel hydroxide paste. The last mentioned reference specifies, inter alia, that the nickel hydroxide has a maximum particle size of 0.04 mm, and three examples specify the largest particle diameter determined with a grindometer in the first case as 23$\mu$m, in the second case as 18 $\mu$m and in a third example as 20 $\mu$m in the paste.

In order to achieve particular properties in the paste for filling the electrodes, the solid particles in the paste have to be given a certain fineness. This is done by grinding the feedstock for producing the paste in a ball mill. The particle-size distribution of the Ni(OH)$_2$ powder used and the particle-size distribution of the solid of a usable paste are advantageously represented in the particle size grid of E. Puffe, as described, for example, in DIN 66 145: "Representation of grain-size or particle-size measurement technology" by W. Batel, Berlin-Gottingen-Heidelbert, Springer-Verlag (1971) and in "Particle-size analysis for professional practice", Issue 23 by W. Alex, B. Koglin and K. Leschonski (Chem.-Ing.-Techn. 46 (1974), No. 1, pages 22 ff.) to Issue 35 (Chem.-Ing.-Techn. 47 (1975), No. 3, pages 97 ff.).

In practice, prior art nickel hydroxide pastes have not always proved suitable for filling electrode frameworks, in particular for the vibration filling of fibrous-structure and foam-structure electrode frameworks.

The object of the present invention is therefore to provide a satisfactorily reproducible aqueous nickel hydroxide or hydrated nickel oxide paste for vibration filling fibrous-structure and foam-structure electrode frameworks with which such electrode frameworks can be rapidly and economically produced.

A further object of the invention is to achieve in one operation a uniform constant filling per unit volume of the framework over the entire pore volume of the electrode framework with a degree of filling with moist active material of 94 to 100%. Yet another object is to minimize the necessary technical comminution work relating to the solid particles in the production of the paste.

These and other objects and advantages are achieved, according to the invention, with a nickel hydroxide or hydrated nickel oxide paste having the properties set forth and described in detail herein.

Before the invention is explained in greater detail with reference to examples, the following explanatory remarks should also be made in relation to the subject:

The polydisperse total system of the solid particles in the aqueous paste should be understood to mean a so-called particle universe (also described as a population) in the paste, which universe is composed of a multiplicity of individual particles of different sizes and shapes (i.e. polydisperse) and having a fineness and particle-size distribution which is governed by the specific surface of the ground material and the intensity of the chemical and physical process in the production of the individual particles.

The distribution ogive (cumulative screen passage distribution) of the polydisperse total system of the solid particles was determined in practice using a Micromeritics Sedigraph 5000 (particle-size analyzer) by means of an automated conventional particle-size analysis method based on Stokes' law. The distribution ogive determined was plotted in a particle-size grid (distribution grid) according to P. Rosin, E. Rammler, K. Sperling and I. G. Bennett which has been standardized according to DIN 66 145. During this process it emerged that the particle-size distribution of the solid particles in the paste is progressive (i.e., the curve defined by the measure points is concave upward) in the region of small particle sizes. This results in a bending away of the existing RRSB straight line from the x-axis for the particle sizes less than 10 $\mu$m which is due to a large fine-particle enrichment. (See DIN 66 145, above.)

In the region relating to particle sizes between 10 and 19 $\mu$m, there is straight line having a particle-size parameter (particle-size characteristic value) of d'=7 $\mu$m, with an oversize of R=36.79% and a uniformity coefficient of n=1.36. In the case of a particle size for the solid particles of greater than 19 $\mu$m, the distribution is degressive, (i.e. the curve defined by the measured points in convex upward). This results in a bending away of the RRSB straight line towards the x-axis between 10 and 19 $\mu$m, which is due to a coarse particle depletion in the polydisperse total system. The particles in the resultant paste take on various shapes, including a rouding off shape.

DETAILED DESCRIPTION OF THE DRAWING

The details of paste according to the invention and the method of making same are developed and described by reference to the following examples:

EXAMPLE 1

A 0.16 molar dispersant solution of the composition $CO_{1.25}K_{1.25}H_{0.25}$ 1-hydroxyethane-1, 1-diphosphonic acid (HEDP) is prepared by weighing out 5.49 kg of 60% strength HEDP acid into a stirred container and diluting to approximately 80 liters with deionized water. Then 1.86 kg of $Co(OH)_2$ are added and dissolved while stirring. 2.36 kg, corresponding to 1.6 liters, of 47 per cent strength potassium hydroxide solution are then added while continuing to stir. After adding the potassium hydroxide solution, the calibrated stirred container is filled to the 100 liter mark with deionized water. (There must not be any dead spaces in which cobalt hydroxide may settle before it is dissolved at the bottom of the stirred container.) The paste mixture of the Co- and Cd- containing paste for positive fibrous-structure electrodes with current collector is prepared for the cylindrical container having a volume of 68dm$^3$ (diameter 445 mm) with a filling of 21 kg of ceramic balls having a diameter of 30 mm and with 21 kg of ceramic balls having a diameter of 40 mm by adding 36 kg of nickel hydroxide powder to the grinding and mixing drums, followed by 1.113 kg of Co powder and then 14.625 kg of dispersant solution. After loading the grinding and mixing drum with $Ni(OH)_2$ powder and cobalt powder, the mixture is ground and dispersed in the sealed ball mill at a rotary speed of 55 revolutions per minute for a rolling time of 8 hours. The mixture yields 52.66 kg of readily processable paste which has a particle-size distribution as follows:

99.5% at 50 μm
63.21% at 5.2 μm
99.0% at 30 μm
50.0% at 3.8 μm
95.0% at 16 μm
40.0% at 2.2 μm
90.0% at 13 μm
35.0% at 1.4 μm
80.0% at 10 μm
30.0% at 0.75 μm and
70.0% at 7.5 μm
25.0% at 0.2 μm This distribution exhibits marked deviations for the empirical RRSB exponential distribution as an exponential equation of the cumulative oversize curve $\mu_R = e^{-b \cdot d^n}$ (where d is the particle size, b and n are characteristic constants) when plotted in a RRSB particle-size grid (distribution grid). The exponential equation follows a straight line in the graphical evaluation with the RRSB particle-size grid of suitable coordinate distribution, the position of the straight line being capable of being plotted even by means of two precisely determined points. With reference to Example 1, however, the distribution curve in the region of particle sizes less than 10 μm is concave upwards, and the distribution in the region of particle greater than 19 μm sizes is convex upward. In the region of a particle size from 10 to 19 μm, the distribution corresponds to an RRSB straight line having the particle size value d′=7 μm as particle-size parameter, where oversize R=36.79%, and a uniformity coefficient of n=1.36.

EXAMPLE 2

In this example, the experimental procedure was as specified in the first example, except that the paste was used for further processing after a rolling time of 5 h. After this rolling time, the paste was still too fluid and two heaped shovels full of nickel hydroxide powder (approximately 2.0 kg of powder) were then added and rolling was carried out for a further half hour. The paste was then ready to use and had a particle-size distribution as plotted in the particle-size grid according to E. Puffe (1950) for the graphic representation and evaluation of particle-size analyses on the basis of the Rosin-Rammler-Speling-Bennett equation. (See FIG. 1, reference numerals 1 and 2, paste of later production.) In this diagram, analyses of three different nickel hydroxide powder deliveries from the same producer are also plotted (FIG. 1, reference numerals 3, 4 and 5).

Using the two paste production modalities mentioned here (Example 1 and 2) it was possible to fill approximately 700 - 2.5 mm thick electrodes of format 2 (110 mm times 160 mm of active area). If the particle-size characteristic value d′ (oversize 36.79%) was between 9.8 μm and 11 μm in the case of the starting powders, the value of the ground and dispersed powder was only 6.14 mm.

The advantages of the aqueous nickel hydroxide or hydrated nickel oxide paste are, in particular, that specifying a particle-size distribution of the polydisperse total system of solid particles of the nickel hydroxide powder or hydrated nickel oxide powder in such an aqueous paste for the vibration filling of fibrous structure electrodes with current collector, which filling must be matched on the one hand to the pore structure and pore-size distribution of the nickel-plated fibrous-structure electrode framework and on the other hand to the electrochemical requirements of the active mass in the electrode, ensures that the frameworks can be filled economically, rapidly and uniformly into the respective differing electrode pore structure over the pore volume of the fibrous-structure electrode framework in one operation as a moist active mass to a degree of filling of 94% to 100%, without constituents of the paste draining off or escaping after the impregnation and the previously planar and cleaned framework surface becoming thicker at certain points on drying the electrode. If the choice of the particle-size distribution of the nickel hydroxide powder used is fine enough, a further advantage is that the technical comminution work in producing the paste is small and that the production times for the pastes are consequently also very short.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. High-flowability aqueous nickel hydroxide or hydrated nickel oxide paste for filling fibrous-structure and foam-structure electrode frameworks, having a nickel hydroxide or hydrated nickel oxide content of 30 to 50% by volume, a plastic viscosity of 0.08 to 1.2 Pa.s, a flow limit of between 9 and 140 Pa, a pH of 8.5 to 11.5, and a content of 0.4 to 6.3% by weight, based on the nickel hydroxide content, of the dispersant from the group comprising the water-soluble salts of the polyphosphonic acids of the di-and polyphosphonic acids or their derivatives, wherein the polydisperse total system of the solid particles in the aqueous nickel hydroxide paste composed of a multiplicity of individual particles of different sizes and shapes, fineness and particle-size distribution has, in relation to particle size, a distribution ogive which is defined by the following pairs of values:

99.5% at 50 μm
63.21% at 5.2 μm
99.0% at 30 μm
50.0% at 3.8 μm
95.0% at 16 μm
40.0% at 2.2 μm
90.0% at 13 μm
35.0% at 1.4 μm
80.0% at 10 μm
30.0% at 0.75 μm and
70.0% at 7.5 μm
25.0% at 0.2 μm, and exhibits marked deviations from the empirical RRSB exponential distribution as an exponential equation of the cumulative oversize curve $\mu_R = e^{-b \cdot d^\eta}$, where d is the particle size, b and n are characteristic constants, when plotted in a RRSB particle-size grid, the exponential equation following a straight line in the graphical evaluation with the RRSB particle-size grid of suitable coordinate distribution, the position of the straight line being capable of being plotted even by means of two precisely determined pints, the deviations being such that the distribution curve in the region of particle sizes less than 10 μm, is concave upwards, and in that distribution in the region of particle greater than 19 μm sizes is convex upward, whereas, in the region of a particle size from 10 to 19 μm, the distribution corresponds to an RRSB straight line having the particle size value d'=7 μm as particle-size parameter, where oversize R=36.79%, and a uniformity coefficient of n=1.36.

2. Aqueous nickel hydroxide or hydrated nickel oxide paste according to claim 1, wherein the solid particles have a rounded-off shape.

3. Process for producing an aqueous nickel hydroxide or hydrated nickel oxide paste for filling fibrous-structure and foam-structure electrode frameworks, having a nickel hydroxide or hydrated nickel oxide content of 30 to 50% by volume, a plastic viscosity of 0.08 to 1.2 Pa.s, a flow limit of between 9 and 140 Pa, a pH of 8.5 to 11.5, and a content of 0.4 to 6.3% by weight, based on the nickel hydroxide content, of a dispersant from the group comprising the water-soluble salts of the polyphosphonic acids or the di- and polyphosphonic acids or their derivatives, wherein the polydisperse total system of the solid particles in the aqueous nickel hydroxide paste composed of a multiplicity of individual particles of different sizes and shapes and fineness, has a paste particle-size distribution having a distribution ogive which is defined by the following pairs of values:

99.5% at 50 μm
63.21% at 5.2 μm
99.0% at 30 μm
50.0% at 3.8 μm
95.0% at 16 μm
40.0% at 2.2 μm
90.0% at 13 μm
35.0% at 1.4 μm
80.0% at 10 μm
30.0% at 0.75 μm and
70.0% at 7.5 μm
25.0% at 0.2 μm, and exhibits marked deviations from the empirical RRSB exponential distribution as an exponential equation of the cumulative oversize curve $\mu_R = e^{-b \cdot d^\eta}$, where d is the particle size, b and n are characteristic constants, when plotted in a RRSB particle-size grid, the exponential equation following a straight line in the graphical evaluation with the RRSB particle-size grid of suitable coordinate distribution, the position of the straight line being capable of being plotted even by means of two precisely determined pints, the deviations being such that the distribution curve in the region of particle sizes less than 10 μm is concave upwards, and in that distribution in the region of particle greater than 19 μm sizes is convex upward, whereas, in the region of a particle size from 10 to 19 μm, the distribution corresponds to an RRSB straight line having the particle size value d'=7 μm as particle-size parameter, where oversize R=36.79%, and a uniformity coefficient of n=1.36, said process comprising the steps of:
providing solid feedstocks in the form of Ni(OH)$_2$ powder having a particle-size distribution which is defined by the pairs of values:
99.0% at 40 μm,
40.0% at 7 μm,
90.0% at 20 μm,
30.0% at 5 μm
80.0% at 15 μm,
20.0% at 4 μm,
70.0% at 13 μm,
10.0% at 2.7 μm,
63.21% at 11 μm,
20.0% at 1.6 μm, and
50.0% at 8.5 μm,
grinding said feedstocks to said paste particle size distribution by the application of the specific comminution energy.

4. Process for producing an aqueous nickel hydroxide or hydrated nickel oxide paste for filling fibrous-structure and foam-structure electrode frameworks, having a nickel hydroxide or hydrated nickel oxide content of 30 to 50% by volume, a plastic viscosity of 0.08 to 1.2 Pa.s, a flow limit of between 9 and 140 Pa, a pH of 8.5 to 11.5, and a content of 0.4 to 6.3% by weight, based on the nickel hydroxide content, of a dispersant from the group comprising the water-soluble salts of the polyphosphonic acids or the di- and polyphosphonic acids or their derivatives, wherein the polydisperse total system of the solid particles in the aqueous nickel hydroxide paste composed of a multiplicity of individual particles of different sizes and shapes and fineness, has a paste particle-size distribution having a distribution ogive which is defined by the following pairs of values:

99.5% at 50 μm
63.21% at 5.2 μm
99.0% at 30 μm
50.0% at 3.8 μm
95.0% at 16 μm
40.0% at 2.2 μm
90.0% at 13 μm
35.0% at 1.4 μm
80.0% at 10 μm
30.0% at 0.75 μm and
70.0% at 7.5 μm
25.0% at 0.2 μm, and exhibits marked deviations from the empirical RRSB exponential distribution as an exponential equation of the cumulative oversize curve $\mu_r = e^{-b \cdot d^n}$, where d is the particle size, b and n are characteristic constants, when plotted in a RRSB particle-size grid, the exponential equation following a straight line in the graphical evaluation with the RRSB particle-size grid of suitable coordinate distribution, the position of the straight line being capable of being plotted even by means of two precisely determined pints, the deviations being such that the distribution curve in the region of particle sizes less than 10 μm is concave upwards, and in that distribution in the region of particle greater than 19 μm sizes is convex upward, whereas, in the region of a particle size from 10 to 19 μm, the distribution corresponds to an RRSB straight line having the particle size value d′=7 μm as particle-size parameter, where oversize R=36.79%, and a uniformity coefficient of n=1.36, said process comprising the steps of:

providing solid feedstocks that have a particle-size distribution substantially the same as said paste particle size distribution, and mixing and dispersing said solid feedstocks with a fluid, without substantial technical comminution.

* * * * *